(12) United States Patent
Matalanis et al.

(10) Patent No.: US 9,407,121 B2
(45) Date of Patent: Aug. 2, 2016

(54) ELECTROMECHANICAL ROTARY ACTUATOR AND METHOD

(75) Inventors: Claude G. Matalanis, Longmeadow, MA (US); Andrzej Ernest Kuczek, Bristol, CT (US); Ulf J. Jonsson, South Windsor, CT (US); Brian E. Wake, South Glastonbury, CT (US); Zaffir A. Chaudhry, South Glastonbury, CT (US); Paul Brewer, Bristol (GB)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1017 days.

(21) Appl. No.: 13/484,689

(22) Filed: May 31, 2012

(65) Prior Publication Data

US 2013/0320782 A1   Dec. 5, 2013

(51) Int. Cl.
*H02K 15/00* (2006.01)
*H02K 5/173* (2006.01)
*H02K 7/14* (2006.01)

(52) U.S. Cl.
CPC ............... *H02K 5/1732* (2013.01); *H02K 7/14* (2013.01); *Y10T 29/49009* (2015.01)

(58) Field of Classification Search
CPC .................................................. H02K 5/1732
USPC ........................................................ 310/90
See application file for complete search history.

(56) References Cited

U.S. PATENT DOCUMENTS

| | | | |
|---|---|---|---|
| 3,495,108 A * | 2/1970 | Van Buskirk | 310/68 R |
| 5,041,748 A | 8/1991 | Huber | |
| 5,205,147 A | 4/1993 | Wada et al. | |
| 6,109,870 A | 8/2000 | Yamakawa et al. | |
| 6,192,684 B1 | 2/2001 | McBirney | |
| 6,225,715 B1 * | 5/2001 | Hoda et al. | 310/67 R |
| 6,422,259 B1 | 7/2002 | Moreno | |
| 6,900,564 B2 * | 5/2005 | Kobayashi et al. | 310/83 |
| 7,573,011 B2 | 8/2009 | Westerweck et al. | |
| 7,677,868 B2 * | 3/2010 | Chaudhry et al. | 416/23 |
| 7,762,770 B2 | 7/2010 | Sun et al. | |
| 7,765,877 B2 | 8/2010 | Venkataraghavan et al. | |
| 2011/0164979 A1 | 7/2011 | Jonsson et al. | |

* cited by examiner

*Primary Examiner* — Dang Le
(74) *Attorney, Agent, or Firm* — Cantor Colburn LLP

(57) ABSTRACT

An electromechanical rotary actuator including a housing including first end that extends to a second end through an intermediate portion that defines a longitudinal axis, and an internal cavity. An electric motor is arranged within the internal cavity. The electric motor includes a shaft having first shaft end and a second shaft end. A drive member is arranged within the housing along the longitudinal axis. The drive member includes an input shaft operatively coupled to the first shaft end and an output shaft. An output shaft member is coupled to the output shaft of the drive member. At least one bearing assembly supports one of the output shaft member and the first shaft end, and a preload member is arranged within the housing and configured to apply a compressive axial force to the at least one bearing, the drive member and the electric motor.

12 Claims, 5 Drawing Sheets

ELECTROMECHANICAL ROTARY ACTUATOR AND METHOD

BACKGROUND OF THE INVENTION

Exemplary embodiments pertain to the art of actuators and, more particularly, to an electromechanical rotary actuator and method of forming an electromechanical rotary actuator.

Many systems require actuators to manipulate various components. The actuators may include linear actuators and rotary actuators. Linear actuators move an element along an axis. In contrast, rotary actuators rotate an element about an axis.

BRIEF DESCRIPTION OF THE INVENTION

Disclosed is an electromechanical rotary actuator including a housing including a first end that extends to a second end through an intermediate portion that defines a longitudinal axis, and an internal cavity. An electric motor is arranged within the internal cavity. The electric motor includes a stator and a rotor that surrounds a shaft having a first shaft end and a second shaft end. A drive member is arranged within the housing along the longitudinal axis. The drive member includes an input shaft operatively coupled to the first shaft end and an output shaft. An output shaft member is coupled to the output shaft of the drive member. The output shaft member extends out from the first end of the housing and is configured and disposed to rotate about the longitudinal axis. At least one bearing assembly supports one of the output shaft member and the first shaft end, and a preload member is arranged within the housing and configured to apply a compressive axial force to the at least one bearing, the drive member and the electric motor. The preload member accommodates thermal expansion of the electromechanical rotary actuator along the longitudinal axis.

Also disclosed is a method of forming an electromechanical rotary actuator. The method includes arranging an electric motor including a shaft having a first shaft end and a second shaft end in a housing defining a longitudinal axis, positioning a drive member having an input shaft and an output shaft in the housing, coupling the input shaft to the first shaft end, coupling an output shaft member to the output shaft with a portion of the output shaft member extending from the housing, supporting the output shaft member with a first bearing assembly and the first shaft end with a second bearing assembly, and applying a compressive axial force through a preload member to the output shaft member, the drive member, the electric motor and the first and second bearing assemblies that accommodates thermal expansion of the electromechanical rotary actuator along the longitudinal axis.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
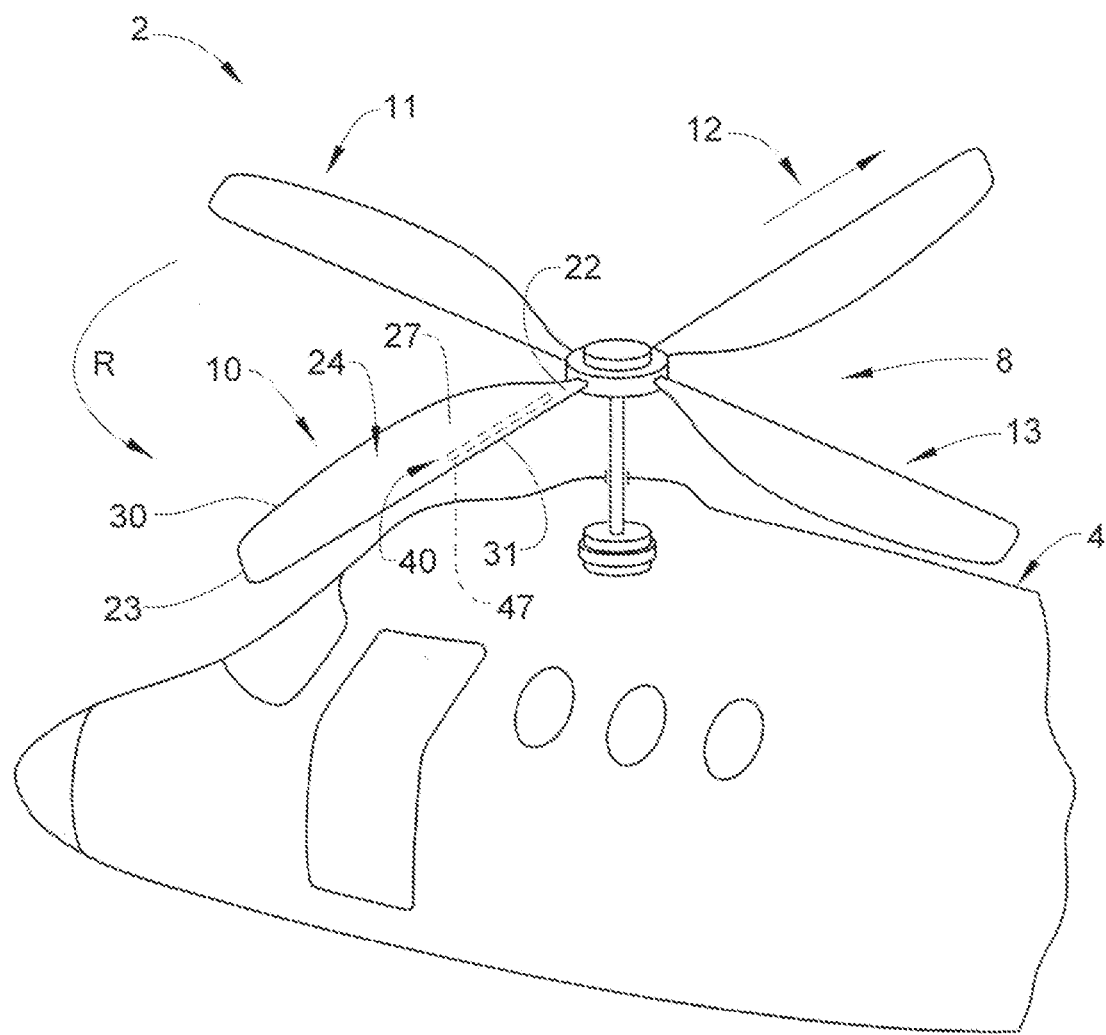
FIG. 1 is a partial perspective view of a helicopter including a rotor blade provided with an electromechanical rotary actuator in accordance with an exemplary embodiment.
Figure 3:
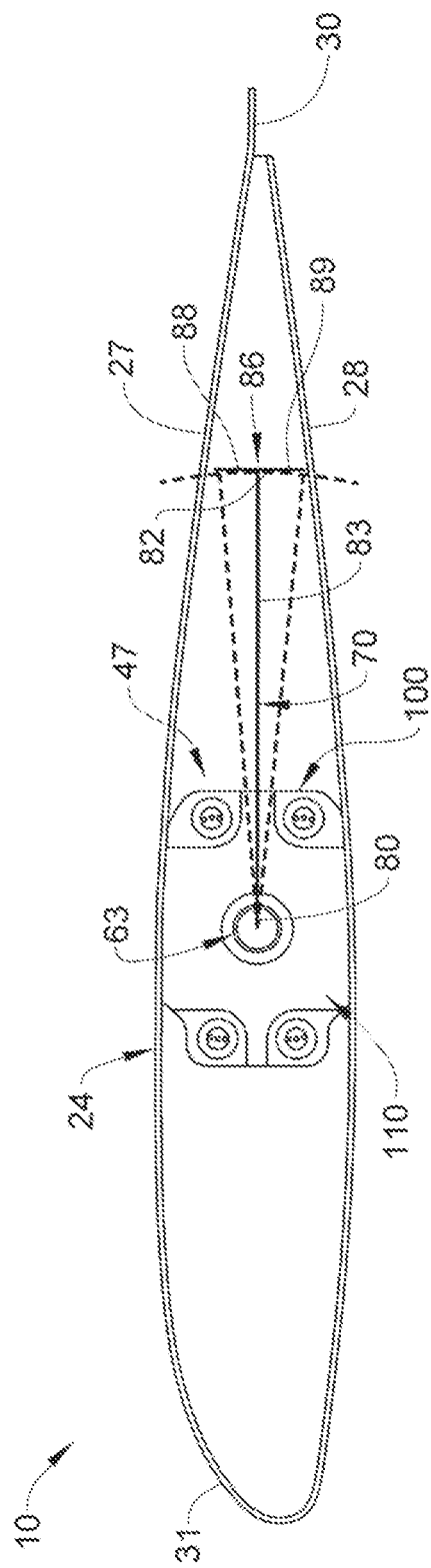
FIG. 3 is an end view of the rotor blade of FIG. 2.

With reference to FIG. 1, a rotary-wing aircraft, constructed in accordance with an exemplary embodiment, is indicated generally at 2. Rotary-wing aircraft 2 includes an airframe 4 and a rotor system 8 including a plurality of rotor blades 10-13. As each rotor blade 10-13 is substantially similar, a detailed description will follow referencing rotor blade 10 with an understanding that the remaining rotor blades 11-13 contain similar structure. Rotor blade 10 includes a first or root portion 22 that extends to a second or tip portion 23 through an airfoil portion 24 having first and second opposing surfaces 27 and 28 (FIG. 3). Rotor blade 10 is further shown to include a trailing edge 30 and an opposing, leading edge 31. As will be detailed more fully below, rotor blade 10 includes a rotor blade control system 40 including an electromechanical rotary actuator 47 arranged within airfoil portion 24.

Figure 2:
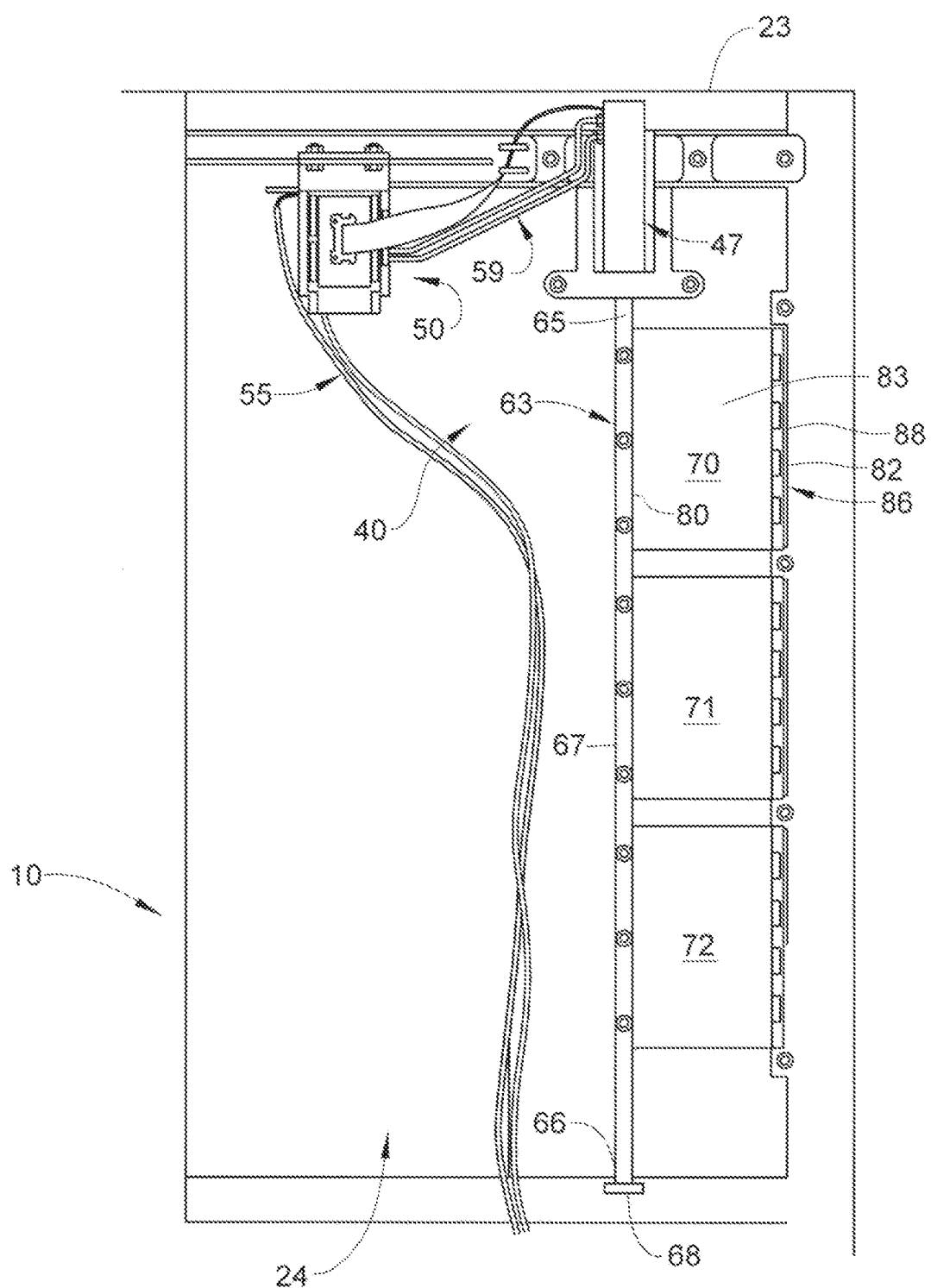
FIG. 2 is a plan view of the rotor blade of FIG. 1 illustrating the electromechanical rotary actuator in accordance with an exemplary embodiment.

As best shown in FIG. 2, rotor blade control system 40 includes a controller 50 mounted within airfoil portion 24. Controller 50 is operatively linked to a control system (not shown) arranged within airframe 4 through a wire harness 55. Controller 50 is also operatively linked to electromechanical rotary actuator 47 through a wire harness 59. Electromechanical rotary actuator 47 is linked to an axle 63. Axle 63 includes a first end 65 that extends to a second end 66 through an intermediate portion 67. First end 65 is operatively coupled to electromechanical rotary actuator 47 while second end 66 is supported by a bearing 68.

In accordance with the exemplary embodiment shown, rotor blade control system 40 includes a plurality of effectors 70-72 arranged within airfoil portion 24. As will be discussed more fully below, effectors 70-72 are selectively deployed between first and second surfaces 27 and 28 (FIG. 1) in order to affect flight dynamics of rotor blade 10. At this point it should be understood that each effector 70-72 is substantially similar such that reference will follow to FIG. 3 in describing effector 70 with an understanding that effectors 71 and 72 include the same or similar structure. As shown, effector 70 includes a first end portion 80 that extends to a second end portion 82 through an intermediate portion 83. First end portion 80 is coupled to axle 63 while second end portion 82 includes a flap 86. Flap 86 includes a first flap portion 88 and a second flap portion 89. Electromechanical rotary actuator 47 rotates effector 70 from a first or stowed position, such that flap 86 is disposed within rotor blade 10 to a second, deployed position, such that flap 86 extends out of the outer periphery of rotor blade 10. At this point it should be understood that the above description is provided for the sake of completeness and to enable a better understanding of one exemplary application of electromechanical rotary actuator 47.

Figure 4:
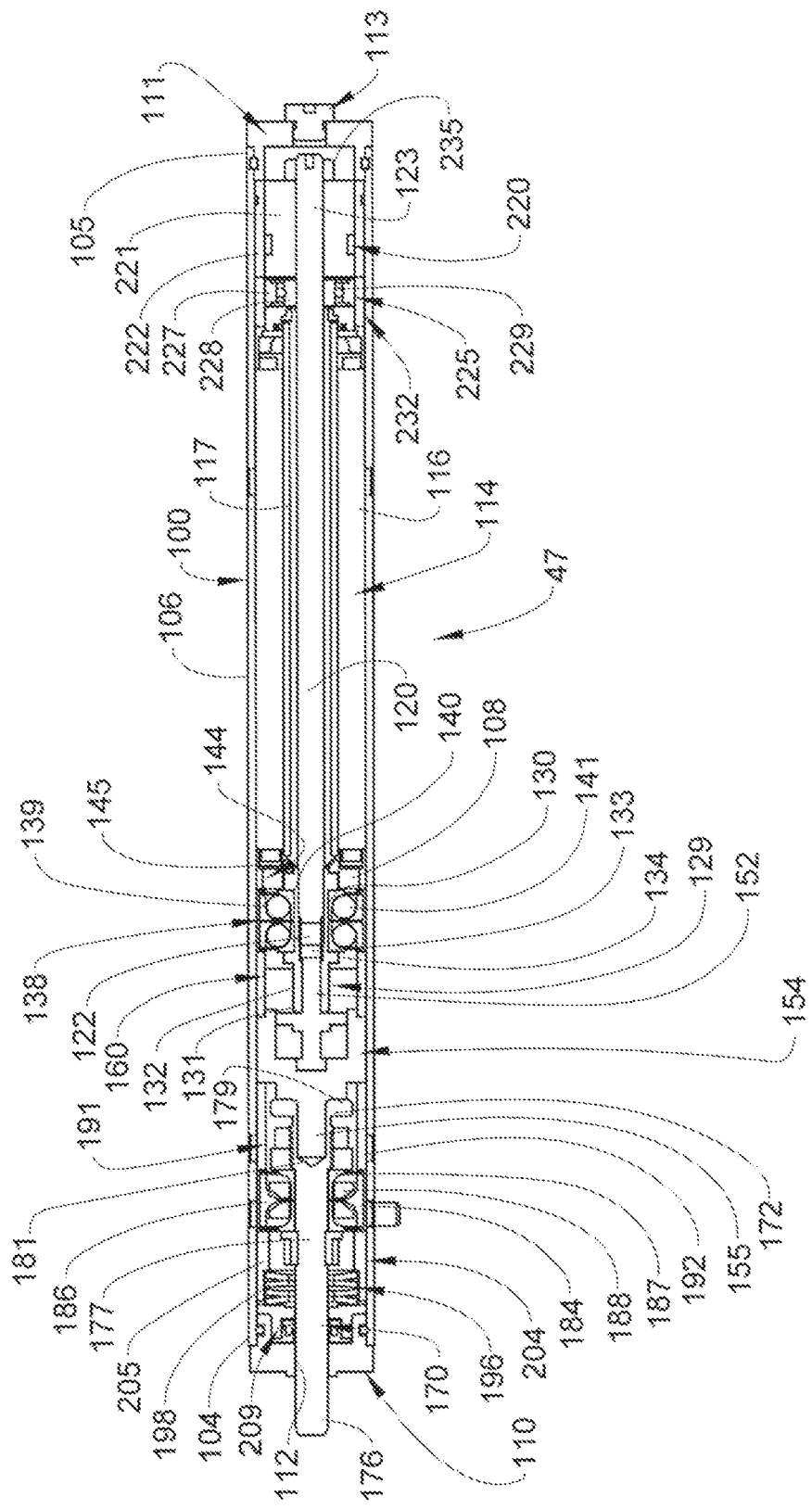
FIG. 4 is a plan view of the electromechanical rotary actuator in accordance with the exemplary embodiment.
Figure 5:
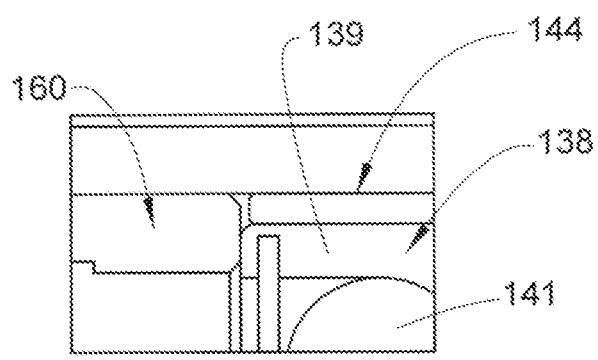
FIG. 5 is a detail view of a portion of the electromechanical rotary actuator in accordance with the exemplary embodiment.
Figure 6:
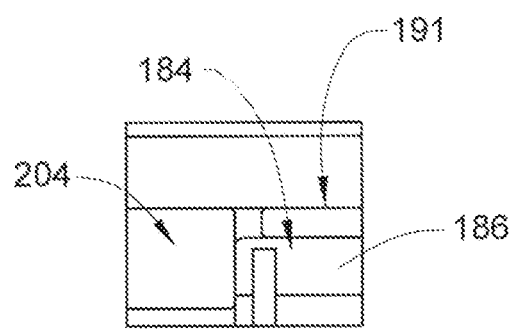
FIG. 6 is a detail view of another portion of the electromechanical rotary actuator in accordance with the exemplary embodiment.

As best shown in FIG. 4, electromechanical rotary actuator 47 includes a housing 100 having a first end 104 that extends to a second end 105 through an intermediate portion 106 that defines a longitudinal axis of electromechanical rotary actuator 47. Housing 100 also includes an internal cavity 108 that supports various components of electromechanical actuator 47. First end 104 includes a first end cap 110 and second end 105 includes a second end cap 111. First end cap 110 includes an opening 112 and second end cap 111 includes a plug 113. An electric motor 114 is arranged within internal cavity 108. Electric motor 114 takes the form of a brushless motor having a stator 116 and a rotor 117. Rotor 117 supports a shaft 120 having a first shaft end 122 and an opposing second shaft end 123. Shaft 120 defines a central axis (not separately labeled) of electromechanical rotary actuator 47.

A coupler 129 is joined to first shaft end 122. Coupler 129 includes a first coupler end 130 and a second coupler end 131, an outer surface 132 and an internal bore 133 that extends between first and second coupler ends 130 and 131. An annular ring 134 extends about outer surface 132. First shaft end 122 extends into internal bore 133 at first coupler end 130. A first bearing assembly 138 rotatably supports first shaft end 122. Bearing assembly 138 includes an outer race 139, and inner race 140 and a plurality of bearing elements 141. First coupler end 130 extends into bearing assembly 138 with annular ring 133 abutting inner race 140. A first bearing housing 144 extends about first bearing assembly 138. First bearing housing 144 includes a raised portion 145 that abuts outer race 139 and stator 114.

Electromechanical rotary actuator 47 also includes a drive member 154 arranged within internal cavity 108. Drive member 154 takes the form of a harmonic drive gear box having a geared input shaft 152 and an output shaft 155. Drive member 154 is configured to produce nearly substantially zero back lash between geared input shaft 152 and output shaft 155. A first spacer 160 is arranged between drive member 154 and first bearing assembly 138. First spacer 160 abuts drive member 154 and outer race 139. An output shaft member 170 is coupled to output shaft 155 of drive member 154. Output shaft member 170 includes a first end section 172 that extends to a second end section 176 through an intermediate section 177. First end section 172 includes a flange 179 and a cavity 181 that receives geared output shaft 155.

A second bearing assembly 184 is positioned to support output shaft member 170. Second bearing assembly 184 includes an outer race 186 and an inner race 187 that support a plurality of bearing elements 188. Inner race 187 is secured to intermediate section 177 of output shaft member 170. Second bearing assembly 184 is surrounded by a second bearing housing 191. Second bearing housing 191 includes a raised portion 192 that abuts outer race 186 of second bearing assembly 184. Second bearing housing 191 also abuts drive member 154. The particular positioning and interaction of output shaft member 170, first and second bearing housings 144 and 191, and first spacer 160 establishes a load path that is radially outward of the central axis of electromechanical rotary actuator 47. That is, instead of external loads passing directly along the central axis, the arrangement of output shaft member 170, first and second bearing housings 144 and 191, and first spacer 160 guides external forces along a load path that is radially outward of the central axis to reduce forces on, for example, electric motor 114 and drive member154.

In accordance with an exemplary embodiment, electromechanical rotary actuator 47 includes a preload member 196 arranged adjacent to second bearing housing 191. Preload member 196 includes a spring 198 arranged within a spring housing 204. Spring 198 engages with a raised portion 205 provided on spring housing 204. A seal ring 209 is arranged between first end cap 110 and spring 198. Spring 198 is compressed between seal ring 209 and spring housing 204 to provide a preload force to output shaft member 170, drive member154, and electric motor 114 as well as additional components of electromechanical rotary actuator 47. The preload or compressive axial force is applied along the longitudinal axis of electromechanical rotary actuator 47. The application of the compressive axial force accommodates thermal expansion of electromechanical rotary actuator 47 along the longitudinal axis. In this manner, electromechanical rotary actuator 47 may be formed to have a compact form factor so as to be mountable in structure that does not possess an abundance of available internal space while also being able to withstand environmental changes including changes in temperature and acceleration. Accommodating thermal expansion in this manner allows actuator 47 to be fabricated from various materials having different thermal expansion coefficients, and also allows actuator 47 to operate in harsh temperature environments. Accordingly, changes in rates of thermal expansion of various ones of the internal components of actuator 47 are absorbed by the preload. In this manner, the internal components will be maintainable within the overall envelope of the actuator.

Electromechanical rotary actuator 47 also includes a resolver 220 operatively connected to second shaft end 123. Resolver 220 is configured to sense an angular position of output shaft member 170 and provide feedback to an external controller (not shown). Resolver 220 includes an inner resolver section 221 connected to second shaft end 123 and an outer resolver section 222. An end bearing assembly 225 is also coupled to second shaft end 123. End bearing assembly 225 includes an outer race 227 and an inner race 228 that retain a plurality of bearing elements 229. Inner race 228 is coupled to second shaft end 123 and outer race 227 is arranged within an end bearing housing 232 that extends between electric motor 114 and resolver 220. End bearing housing 232 transmits external loads from electric motor 114 to outer resolver section 222 along an axis of shaft 120. It should also be understood, that end bearing assembly 225 is not subjected to the compressive axial force provided by preload member 196. In addition, a tensioning nut 235 is provided on second shaft end 123 adjacent to second end cap 111. Tensioning nut 235 aligns with plug 113. In this manner, plug 113 may be removed to provide access to tensioning nut 235. In this manner, first and second end caps 110 and 111 are positioned to adjust the compressive axial force applied by preload member 196. As such, preload member 196 may be adjusted to accommodate differing rates of thermal expansion of various ones of the internal components of actuator 47.

At this point it should be understood that the particular arrangement of components in the electromechanical rotary actuator establishes multiple load paths; a first load path that extends along a central axis that absorbs body forces due to the rotating component being subjected to high accelerations, and a second load path, radially offset from the central axis, that absorbs external loads. A preload in the first load path is established by adjusting tensioning nut 235. The preload allows actuator 47 to accommodate various rates of thermal expansion of the internal components. In this manner, the internal components are maintainable within an overall envelope of actuator 47 regardless of operating/environmental conditions. Also, it should be understood that while described in connection with a rotor blade control system, the electromechanical rotary actuator may be employed to provide a gear reduction or increase for any number of systems desiring a compact system capable of operating in multiple environments and should not be considered as being limited to rotary aircraft or aircraft of any kind.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electromechanical rotary actuator comprising:
a housing including a first end that extends to a second end through an intermediate portion that defines a longitudinal axis, the housing defining an internal cavity;
an electric motor arranged within the internal cavity, the electric motor including a stator and a rotor, the rotor surrounding a shaft having a first shaft end and a second shaft end;
a drive member arranged within the housing along the longitudinal axis, the drive member including an input shaft operatively coupled to the first shaft end and an output shaft;
an output shaft member coupled to the output shaft of the drive member, the output shaft member extending out from the first end of the housing and being configured and disposed to rotate about the longitudinal axis;
at least one bearing assembly supporting one of the output shaft and the first shaft end; and
a preload member arranged within the housing and configured to apply a compressive axial force to the at least one bearing, the drive member and the electric motor, the preload member accommodating thermal expansion of the electromechanical rotary actuator along the longitudinal axis; and
a resolver operatively coupled to the one of the input shaft and the output shaft of the drive member;
wherein the at least one bearing assembly includes a first bearing assembly supporting the first shaft end and a second bearing assembly supporting the output shaft member, and an end bearing assembly arranged to support the second shaft end, the first and second bearing assemblies being subjected to the compressive axial force.

2. The electromechanical rotary actuator according to claim 1, wherein the preload member comprises a spring arranged adjacent the first bearing assembly.

3. The electromechanical rotary actuator according to claim 2, further comprising: a spring housing extending about the spring and abutting an outer race of the first bearing assembly, the spring housing being subjected to the compressive axial force.

4. The electromechanical rotary actuator according to claim 3, further comprising an end cap provided at the first end of the housing, the end cap including an opening that receives the output shaft member.

5. The electromechanical rotary actuator according to claim 4, further comprising: a seal ring arranged between the end cap and the spring, the seal ring being subjected to the compressive axial force.

6. The electromechanical rotary actuator according to claim 1, further comprising: a first bearing housing extending about the first bearing assembly and abutting the stator of the electric motor, the first bearing housing being subjected to the compressive axial force.

7. The electromechanical rotary actuator according to claim 1, further comprising: a spacer arranged between the first bearing assembly and the drive member, the spacer being subjected to the compressive axial force.

8. The electromechanical rotary actuator according to claim 1, further comprising: a second bearing housing extending about the second bearing assembly and abutting the drive member, the second bearing housing being subjected to the compressive axial force.

9. The electromechanical rotary actuator according to claim 1, further comprising: an end bearing housing extending about the end bearing assembly and abutting the resolver, the end bearing housing being subjected to the compressive axial force.

10. The electromechanical rotary actuator according to claim 1, wherein the drive member comprises a harmonic drive gear box.

11. The electromechanical rotary actuator according to claim 1, wherein the electric motor comprises a brushless electric motor.

12. The electromechanical rotary actuator according to claim 1, wherein the housing is arranged within a rotor blade of a rotary aircraft and the output shaft is coupled to a trailing edge effector.

* * * * *